(12) United States Patent
Schrama et al.

(10) Patent No.: US 11,076,083 B2
(45) Date of Patent: Jul. 27, 2021

(54) MULTI-COLOR FLASH WITH IMAGE POST-PROCESSING

(71) Applicant: Lumileds Holding B.V., Schiphol (NL)

(72) Inventors: Charles Schrama, San Jose, CA (US); Nicola Bettina Pfeffer, Eindhoven (NL); Arjen van der Sijde, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/704,864

(22) Filed: Dec. 5, 2019

(65) Prior Publication Data

US 2021/0152719 A1 May 20, 2021

Related U.S. Application Data

(60) Provisional application No. 62/937,550, filed on Nov. 19, 2019.

(51) Int. Cl.
| | |
|---|---|
| *H04N 5/232* | (2006.01) |
| *H04N 5/225* | (2006.01) |
| *G06T 5/00* | (2006.01) |
| *G03B 15/05* | (2021.01) |
| *G06T 5/50* | (2006.01) |

(52) U.S. Cl.
CPC ............ *H04N 5/232* (2013.01); *G03B 15/05* (2013.01); *G06T 5/001* (2013.01); *G06T 5/50* (2013.01); *H04N 5/2256* (2013.01); *G06T 2207/10024* (2013.01); *G06T 2207/20212* (2013.01)

(58) Field of Classification Search
None
See application file for complete search history.

(56) References Cited

U.S. PATENT DOCUMENTS

| | | | |
|---|---|---|---|
| 9,420,248 B2 | 8/2016 | Velarde et al. | |
| 9,766,533 B2 | 9/2017 | Park et al. | |
| 2004/0095478 A1* | 5/2004 | Takano | H04N 1/6086 348/223.1 |

(Continued)

FOREIGN PATENT DOCUMENTS

WO 2021099514 A1 5/2021

OTHER PUBLICATIONS

European Search Report issued for corresponding EP Application 19215671.9 dated Jun. 17, 2020; 11 pages.

(Continued)

*Primary Examiner* — Cynthia Segura
(74) *Attorney, Agent, or Firm* — Patent Capital Group

(57) ABSTRACT

Multi-color flash with image post-processing that uses a camera device with a multi-color flash and implements post-processing to generate images is described. In one aspect, the multi-color flash with image post-processing may be implemented by a controller configured to control a camera and flashes of at least two different colors. The controller may be configured to cause the camera to acquire a first image of a scene while the scene is being illuminated with the first flash but not the second flash, then cause the camera to acquire a second image of the scene while the scene is being illuminated with the second flash but not the first flash, and generate a final image of the scene in post-processing based on a combination of the first image and the second image.

20 Claims, 7 Drawing Sheets

(56) References Cited

U.S. PATENT DOCUMENTS

| | | | | |
|---|---|---|---|---|
| 2004/0145674 | A1* | 7/2004 | Hoppe | H04N 5/2354 |
| | | | | 348/371 |
| 2009/0175555 | A1 | 7/2009 | Mahowald | |
| 2010/0254692 | A1* | 10/2010 | Kurt | G03B 15/03 |
| | | | | 396/155 |
| 2011/0157413 | A1* | 6/2011 | Yoshida | H04N 9/735 |
| | | | | 348/223.1 |
| 2014/0253686 | A1* | 9/2014 | Wong | H04N 13/286 |
| | | | | 348/46 |
| 2015/0130964 | A1* | 5/2015 | Huang | H04N 5/3572 |
| | | | | 348/223.1 |
| 2015/0227025 | A1* | 8/2015 | Park | G03B 15/05 |
| | | | | 348/224.1 |
| 2016/0088278 | A1* | 3/2016 | Velarde | G03B 15/03 |
| | | | | 348/371 |
| 2016/0323518 | A1* | 11/2016 | Rivard | H04N 5/232933 |
| 2017/0085768 | A1* | 3/2017 | Van Der Sijde | H05B 45/10 |
| 2017/0099435 | A1* | 4/2017 | Chen | H04N 9/09 |

OTHER PUBLICATIONS

International Search Report and Written Opinion issued for PCT Application PCT/EP2020/082774 dated Mar. 1, 2021; 15 pages.

* cited by examiner

MULTI-COLOR FLASH WITH IMAGE POST-PROCESSING

CROSS-REFERENCE TO RELATED APPLICATIONS

This application claims the benefit of and priority from U.S. Provisional Patent Application Ser. No. 62/937,550 filed 19 Nov. 2019, entitled "MULTI-COLOR FLASH WITH IMAGE POST-PROCESSING", incorporated herein by reference in its entirety.

TECHNICAL FIELD OF THE DISCLOSURE

The present disclosure relates generally to cameras and, more specifically, to cameras with a multi-color flash.

BACKGROUND

Camera flashes provide illumination in low-light conditions. For optimal color rendering, the color of the flash should match that of the subject and/or the full image. This can be accomplished by using a collection of light sources of different colors so that the combined color point produced by the collection matches that of the subject and/or the full image. Due to their compact size and low power requirements, light-emitting diodes (LEDs) are attractive candidates for light sources used in camera flashes for hand-held, battery-powered devices, such as cameras and cell phones.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
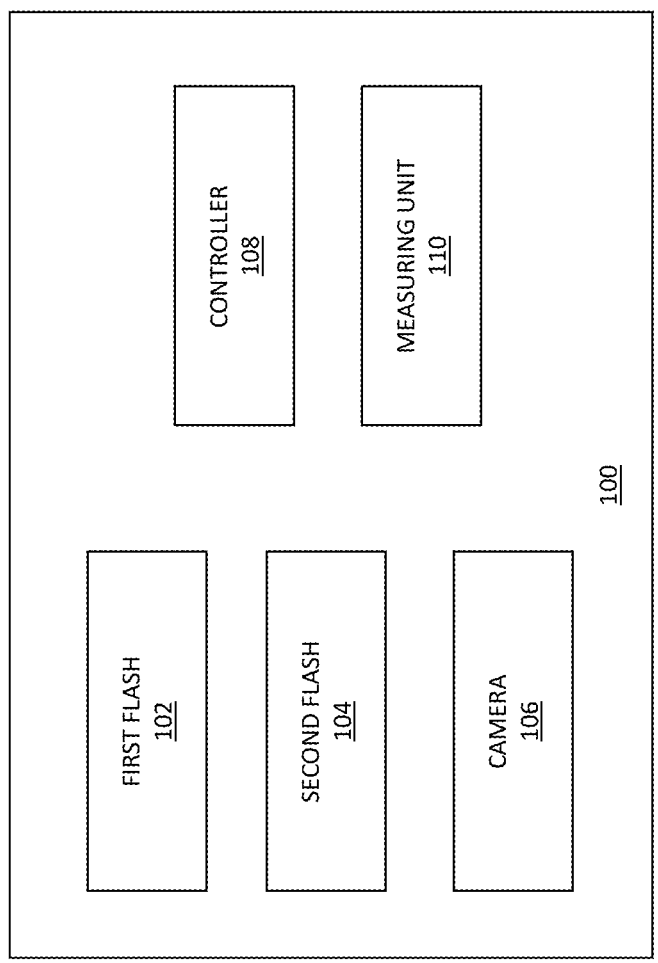
FIG. 1 provides a block diagram illustrating an example camera device, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating multi-color flash with image post-processing described herein, it might be useful to understand phenomena that may come into play in multi-color flash cameras. The following foundational information may be viewed as a basis from which the present disclosure may be properly explained. Such information is offered for purposes of explanation only and, accordingly, should not be construed in any way to limit the broad scope of the present disclosure and its potential applications.

LED flash in cameras (or, more generally, any imaging devices), e.g., in cell phone imaging, provides illumination for when images are acquired in low-light conditions. As described above, for optimal color rendering, the color of the flash should match that of the subject and/or the full image, which can be accomplished by using a collection of light sources of different colors to set the optimal color point. One conventional method to set the right color point is to, first, measure the color point with a camera or other device and, next, tune the collection of LEDs to adjusting the current used to drive each of the LEDs. One challenge with such an approach is that the measurement and tuning should all be done in between the time when the user pushes the button to acquire an image and the time when the camera actually acquires the image. This is a time-critical step and typically requires a specialized processing unit, which can be quite costly in terms of processing power and required components. Executing this kind of pre-processing may be particularly cost-prohibitive for mobile applications, such as multi-flash cameras used in cell phones.

Embodiments of the present disclosure provide an approach that may be referred to as "multi-color flash with image post-processing" in that it uses a camera device with a multi-color flash (i.e., flashes of at least two different colors or color points) and implements post-processing (i.e., processing after the images have been acquired by a camera) to generate images. In one aspect, the multi-color flash with image post-processing may be implemented by a controller configured to control a camera and flashes of at least two different colors (or associated with at least two different color points), referred to as a "first flash" and a "second flash." Generally, as used herein, the term "first flash" may refer to a collection of light sources, e.g., a collection of LEDs, which, when the first flash is used when an image is acquired, cause the image to be associate with a first color point. Similarly, the term "second flash" may refer to a collection of light sources, e.g., a collection of LEDs, which, when the second flash is used when an image is acquired, cause the image to be associate with a second color point, different from the color point. The controller may be configured to cause the camera to acquire a first image of a scene while the scene is being illuminated with the first flash but not the second flash (which may cause the first image to be associated with a first color point), then cause the camera to acquire a second image of the scene while the scene is being illuminated with the second flash but not the first flash (which may cause the second image to be associated with a second color point, different from the first color point), and generate a final image of the scene in post-processing based on a combination of the first image and the second image. For example, the final image may be generated as a weighted average, a squared weighted average, a weighted median, or any other suitable combination of the first and second images to represent the desired balance between the first and second flashes in the final image. In this manner, selection of the optimal/desired color point for the multi-color flash may be performed in post-processing, which may alleviate some of the demands or requirements on the pre-processing steps that have to be performed, advantageously allowing to, e.g., use a less complicated processing unit, which may lead to significant cost savings. For example, in some embodiments, the post-processing of generating the final image may be performed by an application-layer processor. Other features and advantages of the disclosure will be apparent from the following description and the claims.

In the following, the multi-color flash is described with reference to flashes of two different colors (or color points). For example, the first flash could be such that the first color point is a color point of a cold white (CW) color and the second flash could be such that the second color point is a color point of a warm white (WW) color. However, these descriptions can be easily extended to other embodiments where other colors of the first and second flashes may be used, and/or where flashes of more than two different colors may be used, all of which embodiments being within the scope of the present disclosure. Furthermore, while some descriptions may refer to LEDs as the light sources for the flashes of different colors, in other embodiments, any suitable light sources, not limited to the LEDs, may be used. Still further, descriptions provided herein that refer to a flash of one color providing illumination while a flash of another color is off are equally applicable and cover embodiments where the second flash is not completely off but is dimmed, e.g., is dimmed to less than about 30% of its nominal output, to less than about 20%, or to less than about 10%, including all values and ranges therein. Since each flash may be implemented as a collection of light sources, e.g., a collection of LEDs, embodiments could be envisioned where at no point of acquiring the images with different color flashes as described herein all of the LEDs are off. Instead, it could be that different sets of LEDs emit light with different intensities at different moments in time, which result in different color points of the images which are acquired to generate the final image as described herein. Thus, generally, descriptions referring to acquiring a given image while a given flash is illuminating the scene and while other flashes are not illuminating the scene include any embodiments where a given set of light sources emit light, each at a certain intensity (which could be different from one light source to another), resulting in illumination of the scene associated with a certain color point, different from the color points of other one or more flashes. Therefore, multi-color flash with image post-processing described herein refers, generally, to any embodiments where multiple sequential pictures are taken with various flash color points that are combined afterwards, where the flash color point does not necessarily need to be the same as the color point of a given light source or a given set of light sources.

As will be appreciated by one skilled in the art, aspects of the present disclosure, in particular aspects of multi-color flash with image post-processing, described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing camera devices and/or their controllers, etc.) or be stored upon manufacturing of these devices and systems.

In the following detailed description, various aspects of the illustrative implementations may be described using terms commonly employed by those skilled in the art to convey the substance of their work to others skilled in the art. For example, if used, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Camera Device

FIG. 1 provides a block diagram illustrating an example camera device 100 in which multi-color flash with image post-processing may be implemented, according to some embodiments of the present disclosure. As shown in FIG. 1, the camera device 100 may include a first flash 102 (i.e., a flash associated with a first color point), a second flash 104 (i.e., a flash associated with a second color point), a camera 106, a controller 108, and, optionally, a measuring unit 110.

Each of the first flash 102 and the second flash 104 may include a collection of light sources, e.g., a collection of LEDs, which, when the camera 106 acquires an image with one of these flashes illuminating the scene, causes the acquired image to be associate with a different color point. For example, the first flash 102 could be a CW color flash and the second flash 104 could be a WW color flash. In some embodiments, a scene being illuminated with the first flash 102 may include the scene being illuminated by a first plurality of light sources of one or more of a plurality of colors, and a scene being illuminated with the second flash 104 may include the scene being illuminated by a second plurality of light sources of one or more of the plurality of colors, illumination provided by the second plurality of light sources having a different color than illumination provided by the first plurality of light sources. The color of a given flash (or a given light source or a collection of light sources) may originate from different emission spectra of the light source and is characterized by different location (color point) in the RGB color space of the camera 106.

The camera 106 may include any suitable imaging device configured to acquire images of a scene. The camera 106 may be communicatively coupled to the each of the first flash 102 and the second flash 104 so that these flashes may be synchronized to provide illumination of the scene when the camera 106 is acquiring images.

The timing of acquiring images by the camera 106 and the selective engagement of the flashes 102 and 104 in providing illumination when the images are acquired may be controlled by the controller 108, e.g., as described below. The controller 108 may also be configured to generate the final image of a scene based on the images acquired by the camera 106. In some embodiments, the controller 106 may be implemented as, or include at least portions of, a data processing system 700 shown in FIG. 7.

If used, the measuring unit 110 may be configured to perform additional measurements that may be used by the controller 108 in generating the final images. For example, in various embodiments, the measuring unit 110 may be configured to measure one or more of ambient (white) color point, spectrum, ambient (white) RGB response, of ambient correlated color temperature (CCT), and other parameters related to acquired images, such as auto focus, auto exposure, etc. In some embodiments, the measuring unit 110 may also be configured to perform measurements of, or measurements that enable calculation of, the values of Ra, Ba, Ga, described below, e.g., the values used in equations (1)-(3) provided below.

Although the camera device 100 illustrates only two flashes of different colors, namely, the flashes 102 and 104, in other embodiments, additional flashes of different colors may be included in the camera device 100. In addition, in further embodiments the camera device 100 may include other components. For example, in some embodiments, the camera device 100 may further include an output device, configured to display, e.g., one or more of the first image, the second image, and the final image as described herein. In another example, in some embodiments, the camera device 100 may further include an input device, configured to receive user input to be used by the camera device to perform one of more of 106 cause the camera to acquire the first image, cause the camera 106 to acquire the second image, and the controller 108 generate the final image. In yet another example, in some embodiments, the camera device 100 may further include one or more communication chips and an antenna, configured to wirelessly transmit one or more of the first image, the second image, and the final image, and/or wirelessly receive input to be used by the camera device 100 to perform one of more of cause the camera to acquire the first image, cause the camera to acquire the second image, and generate the final image.

Furthermore, while various components are shown in FIG. 1 as included within the camera device 100, in various embodiments, the camera device 100 may refer to a device that includes to any combination of one or more of these components, in which case the other components shown in FIG. 1 may be implemented externally (i.e., in a separate device) and may be communicatively coupled to components of the camera device 100 as needed, via any appropriate communication channel, to implement the multi-flash with image post-processing as described herein.

In various embodiments, the camera device 100 may be, e.g., a wearable camera device (e.g., a smart watch), a hand-held camera device (e.g., a mobile phone), or a stationary camera (e.g., a security/surveillance camera).

Example Method

Figure 2:
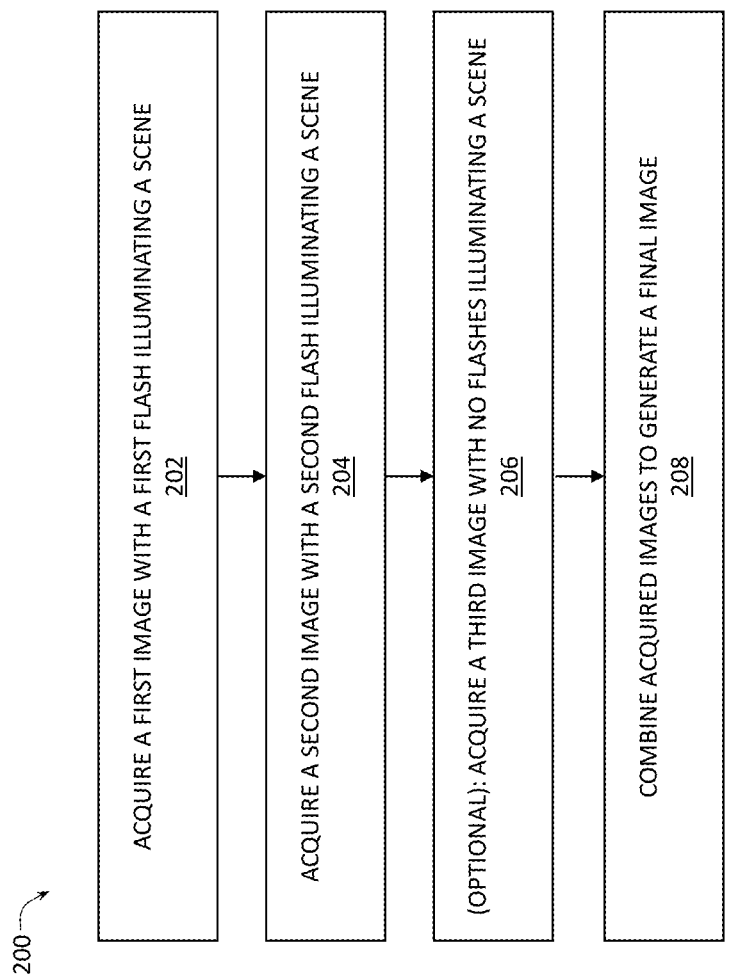
FIG. 2 provides a flow chart of a method for performing multi-flash with image post-processing, according to some embodiments of the present disclosure.
Figure 3:
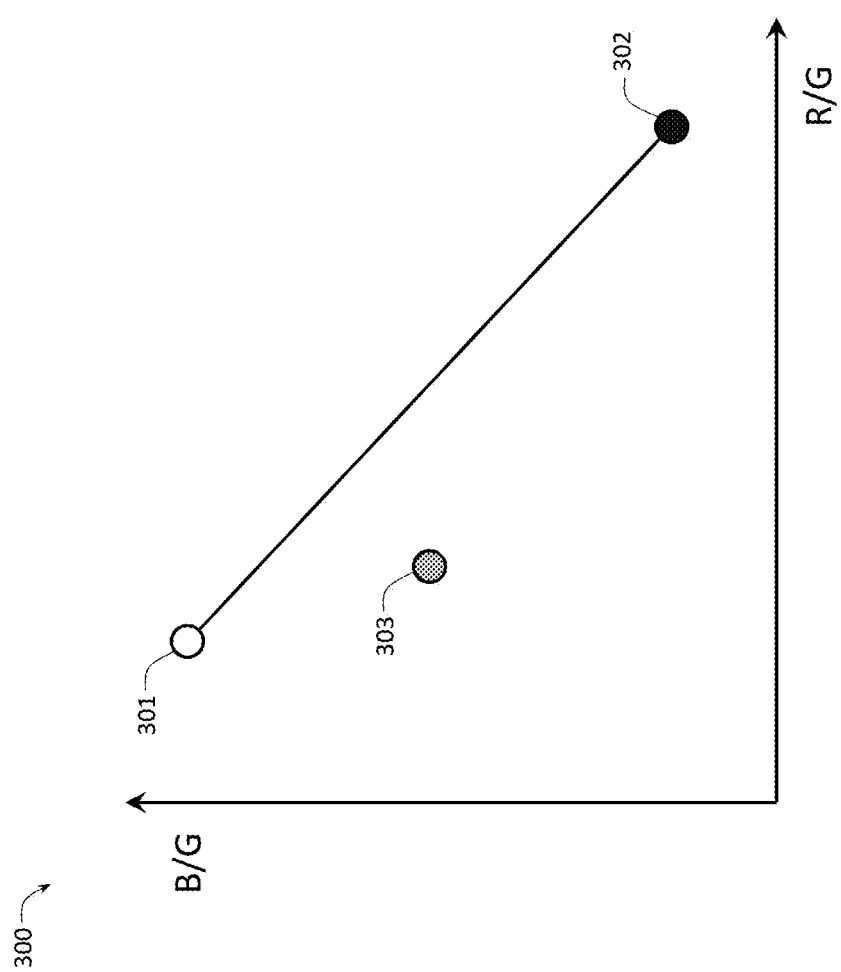
FIG. 3 provides an example plot illustrating color points of flashes of two different colors and a color point of ambient lighting, according to some embodiments of the present disclosure.

FIG. 2 illustrates a flow chart of a method 200 for performing multi-flash with image post-processing, according to some embodiments of the present disclosure. Although method 200 is now described with reference to elements illustrated in FIG. 1, any system or apparatus configured to perform various processes of this method, in any order, is within the scope of the present disclosure.

As shown in FIG. 2, the method 200 may begin with a process 202 which includes the controller 108 causing the camera 106 to acquire a first image of a scene while the scene is being illuminated with the first flash 102 but not with the second flash 104. Similarly, in a process 204 of the method 200, the controller 108 causes the camera 106 to acquire a second image of the scene while the scene is being illuminated with the second flash 102 but not with the first flash 102. In general, the processes 202 and 204 represent that the method 200 includes the camera 106 acquiring separate images with flashes of different colors, where for each of these images, one or more of the flashes are illuminating the scene during image acquisition, while one or more other flashes are off. Typically, ambient light would also be present and also provide illumination for the scene when images with the external illumination from the flashes 102 or 102 are acquired. Thus, more generally, the process 202 includes the controller 108 causing the camera 106 to acquire the first image while the scene is being illuminated with the first flash 102 and the ambient light, while the process 204 includes the controller 108 causing the camera 106 to acquire the second image while the scene is being illuminated with the second flash 102 and the ambient light.

As shown in FIG. 2, the method 200 may also include an optional process 206 which includes the controller 108 causing the camera 106 to acquire a third image of the scene while the scene is not being illuminated with the first or second flashes 102, 104 (or, more generally, while the scene is not being illuminated with any flash and only ambient light may be present).

While the images acquired in the processes 202, 204, and 206 are referred to as first, second, and third images, in general, these processes may be performed in order other than what is shown in FIG. 2. For example, in some embodiments, the order may be as follows: first, the process 202 is performed, then the process 206 is performed after the process 202, then the process 204 performed after the process 206.

Furthermore, in some embodiments, the method 200 may include performing any of the processes 202, 204, and 206 multiple times, e.g., to compensate for motion-related artefacts. In some such embodiments, any of the processes 202, 204, and 206 may be repeated multiple times consecutively. In other such embodiments, the method 200 any combination of these processes. For example, the method 200 may include performing the processes 202, 204, and 206 in the following order: 202, 206, 202, 202, 204, 206, 202, 206, 202, 206, 204. In general, any combination of these processes may be included in the method 200. In this context, for all descriptions provided herein, the first, second, and third images may refer to not necessarily the pixel values of the images as they were acquired by the camera 106, but to any combination of the pixel values from multiple instances of acquiring each of the images. For example, if the method 200 includes repeating the process 202 multiple times, the "first image" may refer to a matrix of pixel values where each pixel value is a combination, e.g., an average or any other statistical representation, of the corresponding pixel values in multiple instances of the images originally acquired in each of the processes 202. In this context, a pixel value of one image may be referred to as being "corresponding to a pixel value of another image" when these pixel values are of pixels in the same position/location within a matrix of pixels of the images. For example, a pixel value of the pixel (1,1) of the matrix of pixels of one image (i.e., the pixel in the first row and the first column of the array of pixels of that image) corresponds to a pixel value of the pixel (1,1) of the matrix of pixels of another image.

Furthermore, what is considered to be a pixel value may be different in different embodiments of the method 200. In some embodiments, different pixels may be monochromatic pixels. In other embodiments, different pixels may be (R, G, B)-pixels. In still other embodiments, different pixels may be other combination of colors, e.g., RGBW or RGB/Cyan. Unless specified otherwise, referring to "pixel values" in any of the explanations provided herein, values of pixels according to any of these embodiments are within the scope of the present disclosure.

Acquisition of the images with different color flashes providing illumination, and with no external flashes but only with ambient light providing illumination, causes these images to be associated with different color points which may later be used by the controller 108 to combine the images in post-processing to generate the final image. To that end, in some embodiments, a color point of an image may be illustrated in a plot, some examples of which being shown in FIGS. 3-6, described in greater detail below, each of which illustrates a white dot representing a color point of the first image (i.e., the image acquired in the process 202), a black dot representing a color point of the second image (i.e., the image acquired in the process 204), and a grey dot representing a color point of the third image (i.e., the image acquired in the process 206).

Turning back to FIG. 2, the method 200 may also include a process 208 which includes the controller 108 generating a final image of the scene based on a combination of at least the first image and the second image, possibly in combination with the third image (since the acquisition the third image is optional). Some examples of the combination are described below. It is to be understood that, in various further embodiments, there could be additional processing steps involved in performing the process 208, which are not specifically described here but are known in the art of image processing, such as normalization of brightness of the acquired images (e.g., relative to one or more of image sensor sensitivity, exposure time, and possible other settings of the camera 106 during acquisition of the images), depending on the type of input images (e.g., jpeg or raw or . . . ), a correction including the Gamma curve, application of the same color correction matrix on all pictures (if not fixed before acquiring the images), etc.

In some embodiments, the process 208 may include the controller 108 applying respective weights to the pixel values of the first and second images to generate what may be referred to as "modified" first and second images (e.g., where each pixel value of the originally acquired image is multiplied by a certain weight), and then combining the pixel values of the modified first and second images to generate the final image. For example, in some embodiments, the process 208 may include the controller 108 generating a modified first image by multiplying each of pixel values of the first image by a first weight (the first weight being a value equal to or greater than zero and equal to or less than 1) and generating a modified second image by multiplying each of pixel values of the second image by a second weight (the second weight being a value so that the sum of the first and second weights is equal to 1, for the embodiments where only two different flashes are used). The process 208 may also include the controller 108 generating the final image by adding, e.g., on a pixel-by-pixel basis, a pixel value of the modified first image with a corresponding pixel value of the modified second image. In this manner, the final image may be generated as a weighted average of the first and second images. However, in other embodiments, the weights may be used differently to generate the final images. For example, in various other embodiments, the final image may be generated as a squared weighted average, a weighted median, or any other suitable combination of the first and second images (possibly with weights applied thereto) to represent the desired balance between the first and second flashes in the final image. In some embodiments where the weights are used, the weights may be such that a sum of all weights applied to images with different color of flashes add up to 1. Some examples of how weights may be used by the controller 108 to implement the process 208 of the method 200 are described with reference to FIGS. 3-6, where the controller 108 may be configured to compute a correction factor γ to apply to the first image to generate the modified first image (i.e., the weight applied to the first image is equal to, or is based on, the correction factor γ), and apply a correction factor equal to 1−γ to the second image to generate the modified second image (i.e., the weight applied to the second image is equal to, or is based on, the correction factor 1−γ).

Besides various embodiments being possible for generating and applying weights to the first and second images, how the modified first and second images are combined in the process 208 may also be carried out in various manners. In some embodiments, the controller 108 may be configured to combine the modified first and second images to generate the final image on a pixel-by-pixel basis by somehow combining pixel values of the modified first image with corresponding pixel values of the modified second image. In this context, as used herein, describing an action being performed "on pixel-by-pixel basis" refers to performing the action for each one of the pixels individually. For example, the controller 108 adding, on a pixel-by-pixel basis, a pixel value of the modified first image with a corresponding pixel value of the modified second image refers to the controller 108 adding a pixel value of the pixel (1,1) of the modified first image with a pixel value of the pixel (1,1) (i.e., the corresponding pixel value) of the modified second image, adding a pixel value of the pixel (1,2) of the modified first image with a pixel value of the pixel (1,2) (i.e., the corresponding pixel value) of the modified second image, and so on.

In some embodiments of the method 200, the method may further include receiving a user input indicative of a factor representing a balance between the first image and the second image in the final image, and then generating the final image in the process 208 based on the received factor. For example, in some such embodiments, the controller 108 may be configured to generate a modified first image by multiplying each of pixel values of the first image by a first weight indicative of the received factor, generating a modified second image by multiplying each of pixel values of the second image by a second weight, indicative of the received factor, and generating the final image by adding, on a pixel-by-pixel basis, a pixel value of the modified first image with a corresponding pixel value of the modified second image. Discussions provided above with respect to generating the final image in a way other than the simple weighted combination of the first and second images are applicable to such embodiments as well.

While discussions of the method 200 and other discussions provided herein refer to processing of images, these discussions are equally applicable to processing of video signals that may be acquired if the camera 106 is a video recording device that generates a video that includes a plurality of consecutive frames. In this context, each of the frames may be generated as the final image described herein.

Examples of computing a correction factor to be applied in generation of the final image As briefly described above, in some embodiments, the process 208 may include the controller 108 computing what is referred to herein as a "correction factor" (denoted as γ) based on the color points of the first, second, and third images, and then applying the correction factor to the first and second images to compute pixels values of the final image. FIGS. 3-6 provide different examples of how the correction factor γ could be computed.

Each of FIGS. 3-6 illustrates a white dot 301, representing a color point of the first flash 102 (e.g., computed by the controller 108 based on the first image acquired in the process 202), a black dot 302, representing a color point of the second flash 104 (e.g., computed by the controller 108 based on the image acquired in the process 204), and a grey dot 303, representing a color point of the ambient light (e.g., computed by the controller 108 based on the third image acquired in the process 206 or obtained based on the measurements of the measurement unit 110). The horizontal axis of the examples of each of FIGS. 3-6 illustrates a value indicative of a sum of all or a sub-set of all red pixels of a given image (R) divided by a value indicative of a sum of all or a sub-set of all green pixels of a given image (G), i.e., R/G, while the vertical axis of each of FIGS. 3-6 illustrates a value indicative of a sum of all or a sub-set of all blue pixels of a given image (B) divided by a value indicative of a sum of all or a sub-set of all green pixels of a given image (G), i.e., B/G. However, this is just one example of how a plot with color points of different flashes and the color point of ambient light may be represented in order to compute a correction factor to apply to the first and second images to generate the final image in the process 208, the example being one particular example given for an RGB camera. In other embodiments, measures indicative of various pixel values of the flash-illuminated images and ambient light color points could be different.

For the specific example shown in FIGS. 3-6, the coordinates of the first flash color point 301 within the plot 300 may be ($R_{cw}/G_{cw}$; $B_{cw}/G_{cw}$), the coordinates of the second flash color point 302 within the plot 300 may be ($R_{ww}/G_{ww}$; $B_{ww}/G_{ww}$), while the coordinates of the ambient color point 303 within the plot 300 may be ($R_a/G_a$; $B_a/G_a$). In this notation, "CW" refers to "cold white" indicating that the first flash 102 could be of a first color that is CW, "WW" refers to "warm white" indicating that the second flash 104 could be of a second color that is WW, while "a" refers to "ambient."

Figure 4:
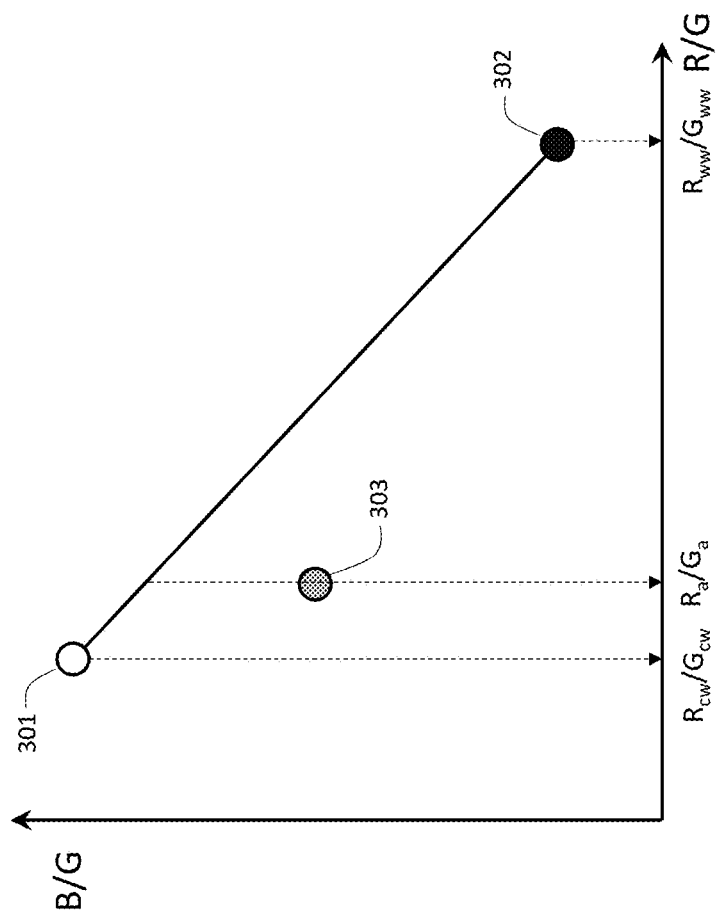
FIG. 4 illustrates an example of using the plot of FIG. 3 to compute a correction factor with respect to the flash of the first color, according to some embodiments of the present disclosure.

In particular, FIG. 4 illustrates that, in some embodiments, the correction factor γ may be computed with reference to the horizontal axis of the plot 300. In particular, FIG. 4 illustrates that the correction factor may be computed based on where the ambient color point 303 is located, along the horizontal axis of the plot 300, with respect to the location of the first flash color point 301 and the location of the second flash color point 302 along the horizontal axis. To that end, FIG. 4 illustrates the coordinates of the color points 301, 302, and 303 along the horizontal axis, and these values may be used to compute the correction factor γ as follows:

$$\gamma = \frac{(R_a/G_a) - (R_{ww}/G_{ww})}{(R_{cw}/G_{cw}) - (R_{ww}/G_{ww})} \quad (1)$$

Figure 5:
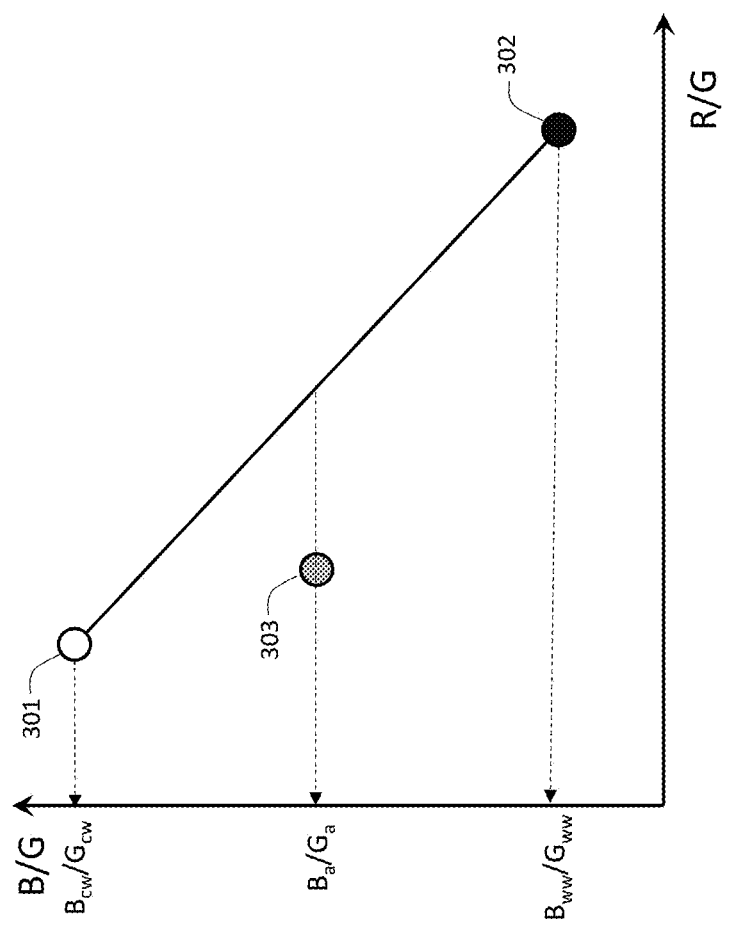
FIG. 5 illustrates an example of using the plot of FIG. 3 to compute a correction factor with respect to the flash of the second color, according to some embodiments of the present disclosure.

FIG. 5 illustrates that, in some embodiments, the correction factor γ may be computed with reference to the vertical axis of the plot 300. In particular, FIG. 5 illustrates that the correction factor may be computed based on where the ambient color point 303 is located, along the vertical axis of the plot 300, with respect to the location of the first flash color point 301 and the location of the second flash color point 302 along the vertical axis. To that end, FIG. 5 illustrates the coordinates of the color points 301, 302, and 303 along the vertical axis, and these values may be used to compute the correction factor γ as follows:

$$\gamma = \frac{(B_a/G_a) - (B_{ww}/G_{ww})}{(B_{cw}/G_{cw}) - (B_{ww}/G_{ww})} \quad (2)$$

Figure 6:
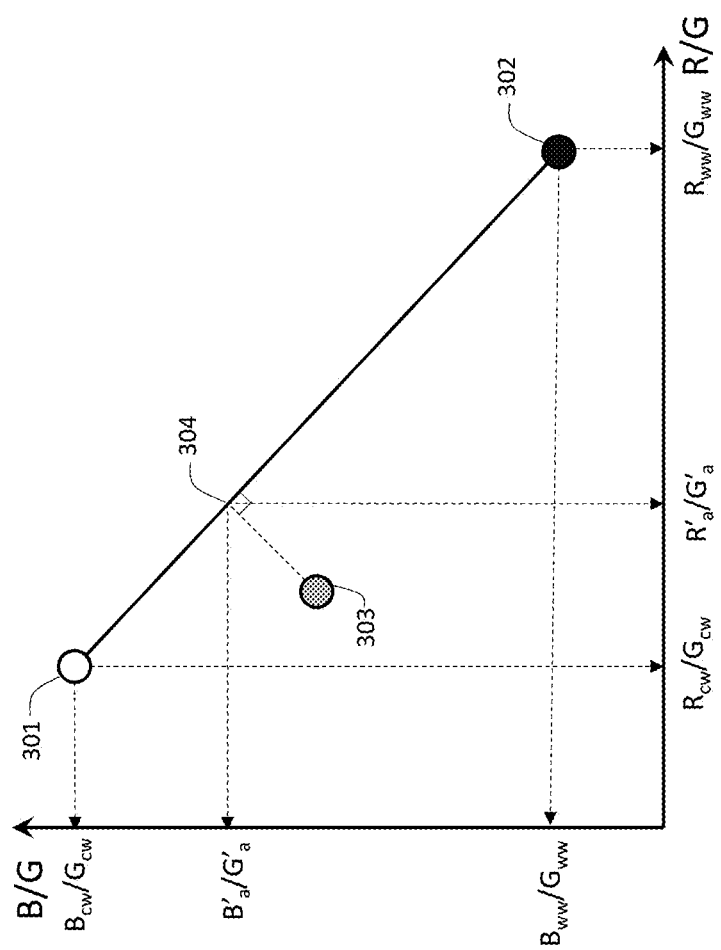
FIG. 6 illustrates an example of using the plot of FIG. 3 to compute a correction factor with respect to the flashes of both colors, according to some embodiments of the present disclosure.

Finally, FIG. 6 illustrates that, in some embodiments, the correction factor γ may be computed with reference to the straight line connecting the first flash color point 301 and the second flash color point 302 of the plot 300. In particular, FIG. 6 illustrates that the correction factor may be computed based on where the ambient color point 303 is located, along the straight line connecting the first flash color point 301 and the second flash color point 302 in the plot 300, with respect to the location of the first flash color point 301 and the location of the second flash color point 302 along that line. To that end, FIG. 6 illustrates the coordinates of the color points 301 and 302, and the coordinates $(R'_a/G'_a; B'_a/G'_a)$ of the projection (point 304, labeled in FIG. 6) of the ambient color point 303 onto the line connecting the color points 301 and 302. In such embodiments, the correction factor γ may be computed as follows:

$$\gamma = \frac{(B'_a/G'_a) - (B_{ww}/G_{ww})}{(B_{cw}/G_{cw}) - (B_{ww}/G_{ww})} = \frac{(R'_a/G'_a) - (R_{ww}/G_{ww})}{(R_{cw}/G_{cw}) - (R_{ww}/G_{ww})} \quad (3)$$

In each of these examples, the correction factor γ may be a value between 0 and 1, and it may be applied to the first and second images in any of the ways described above. Furthermore, while FIG. 6 illustrates identifying the position of the ambient color point with respect to the straight line connecting the color points 301 and 302, in other embodiments, the ambient color point 303 could be referenced to a curved line, or some other line that is not straight, between the color points 301 and 302. Still further, when flashes of more than two colors are used, the ambient color point could be determined with respect to correspondingly more than two color points.

Example Data Processing System

Figure 7:
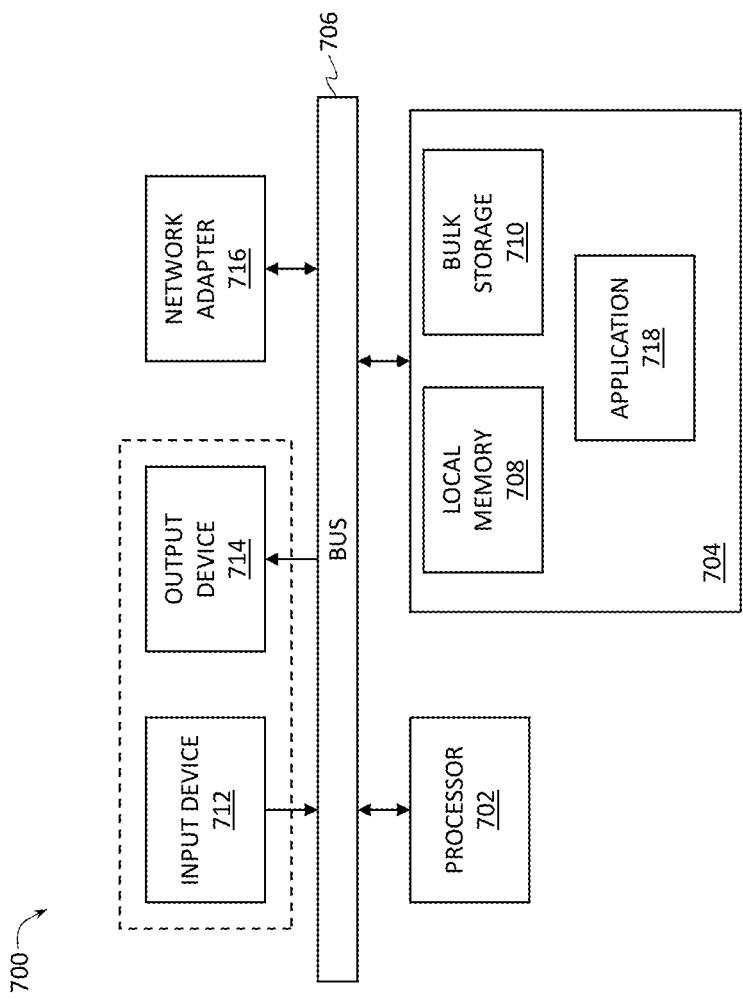
FIG. 7 provides a block diagram illustrating an example data processing system that may be configured to implement at least portions of multi-color flash with image post-processing as described herein, according to some embodiments of the present disclosure.

FIG. 7 provides a block diagram illustrating an example data processing system 700 that may be configured to implement at least portions of camera devices with multi-flash with image post-processing as described herein, e.g., of the camera devices as described with reference to FIGS. 1-6, according to some embodiments of the present disclosure.

As shown in FIG. 7, the data processing system 700 may include at least one processor 702, e.g. a hardware processor 702, coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this disclosure.

In some embodiments, the processor 702 can execute software or an algorithm to perform the activities as discussed in this specification, in particular activities related to multi-flash with image post-processing described herein. The processor 702 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 702 may be communicatively coupled to the memory element 704, for example in a direct-memory access (DMA) configuration, so that the processor 702 may read from or write to the memory elements 704.

In general, the memory elements 704 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 700 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIG. 1, can also include suitable interfaces for receiving, transmitting, and/or otherwise communicating data or information in a network environment so that they can communicate with, e.g., the data processing system 700 of another one of these elements.

In certain example implementations, mechanisms for implementing multi-flash with image post-processing in camera devices as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 704 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 702 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

As shown in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Input/output (I/O) devices depicted as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 714 may be any type of screen display, such as plasma display, liquid crystal display (LCD), organic light emitting diode (OLED) display, electroluminescent (EL) display, or any other indicator, such as a dial, barometer, or light emitting diode (LED). In some implementations, the system may include a driver (not shown) for the output device 714. Input and/or output devices 712, 714 may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

SELECT EXAMPLES

Example 1 provides a camera device that includes a controller, configured to cause a camera to acquire a first image of a scene while the scene is being illuminated with a first flash while not being substantially illuminated with a second flash, the first flash causing the first image to be associated with a first color point; cause the camera to acquire a second image of the scene while the scene is being illuminated with a second flash while not being substantially illuminated with the first flash, the second flash causing the second image to be associated with a second color point, different from the first color point; and generate a final image of the scene based on a combination of the first image and the second image.

Example 2 provides the camera device according to example 1, where the controller is configured to generate the final image of the scene based on the combination of the first image and the second image by generating a modified first image by multiplying each of pixel values of the first image by a first weight (the first weight being a value equal to or greater than zero and equal to or less than 1), generating a modified second image by multiplying each of pixel values of the second image by a second weight (the second weight being a value equal to 1 minus the first weight for the embodiments where only two different flashes are used), and generating the final image by adding, on a pixel-by-pixel basis, a pixel value of the modified first image with a corresponding pixel value of the modified second image. In this manner, the final image may be generated as a weighted average of the first and second images.

Example 3 provides the camera device according to example 1, where the controller is further configured to cause the camera to acquire a third image of the scene while the scene is not being illuminated with the first flash and not being illuminated with the second flash (e.g., the third image may be acquired with only the ambient lighting). Such a third image may be used to determine the ambient color point as described herein. In other examples, the ambient color point could be determined based on the measurements by the measurement unit 110.

Example 4 provides the camera device according to example 3, where the controller is configured to generate the final image of the scene based on the combination of the first image and the second image by computing a multi-color flash post-processing factor ($\gamma$) based on at least a sub-set of pixel values of the first image, the second image, and the third image, generating a modified first image by multiplying each of pixel values of the first image by $\gamma$, generating a modified second image by multiplying each of pixel values of the second image by a value equal to $1-\gamma$, and generating the final image by adding, on a pixel-by-pixel basis, a pixel value of the modified first image with a corresponding pixel value of the modified second image.

Example 5 provides the camera device according to example 4, where the third image is associated with a third color point, each of the first color point, the second color point, and the third color point has a respective different location in a plot having a first axis and a second axis, the first axis of the plot indicating values of a ratio of a sum of at least the sub-set of pixel values of a first primary color to a sum of at least the sub-set of pixels values of a third primary color, and the second axis of the plot indicating values of a ratio of a sum of at least the sub-set of pixels values of a second primary color to the sum of at least the sub-set of pixels values of the third primary color, and the controller is configured to compute γ based on at least the sub-set of pixel values of the first image, the second image, and the third image by computing a value indicative of the location of the third color point with respect to the location of the first color point and the location of the second color point along the first axis of the plot.

Example 6 provides the camera device according to example 4, where the third image is associated with a third color point, each of the first color point, the second color point, and the third color point has a respective different location in a plot having a first axis and a second axis, the first axis of the plot indicating values of a ratio of a sum of at least the sub-set of pixel values of a first primary color to a sum of at least the sub-set of pixels values of a third primary color, and the second axis of the plot indicating values of a ratio of a sum of at least the sub-set of pixels values of a second primary color to the sum of at least the sub-set of pixels values of the third primary color, and the controller is configured to compute γ based on at least the sub-set of pixel values of the first image, the second image, and the third image by computing a value indicative of the location of the third color point with respect to the location of the first color point and the location of the second color point along the second axis of the plot.

Example 7 provides the camera device according to example 4, where the third image is associated with a third color point, each of the first color point, the second color point, and the third color point has a respective different location in a plot having a first axis and a second axis, the first axis of the plot indicating values of a ratio of a sum of at least the sub-set of pixel values of a first primary color to a sum of at least the sub-set of pixels values of a third primary color, and the second axis of the plot indicating values of a ratio of a sum of at least the sub-set of pixels values of a second primary color to the sum of at least the sub-set of pixels values of the third primary color, and the controller is configured to compute γ based on at least the sub-set of pixel values of the first image, the second image, and the third image by computing a value indicative of the location of the third color point with respect to a line in the plot connecting the location of the first color point and the location of the second color point.

Example 8 provides the camera device according to example 1, where the controller is configured to generate the final image of the scene based on the combination of the first image and the second image by receiving a user input indicative of a factor representing a balance between the first image and the second image in the final image, generating a modified first image by multiplying each of pixel values of the first image by a first weight indicative of the factor, generating a modified second image by multiplying each of pixel values of the second image by a second weight, indicative of the factor, and generating the final image by adding, on a pixel-by-pixel basis, a pixel value of the modified first image with a corresponding pixel value of the modified second image.

Example 9 provides the camera device according to any one of the preceding examples, where the camera device is a video recording device configured to generate a video that includes a plurality of consecutive frames, and the final image is one of the plurality of frames of the video.

Example 10 provides the camera device according to example 9, where each frame of the plurality of frames of the video is generated as a respective final image based on the combination of a respective first image and a respective second image acquired for the frame.

Example 11 provides the camera device according to any one of the preceding examples, where the scene being illuminated with the first flash includes the scene being illuminated by a first plurality of light sources of one or more of a plurality of colors, and the scene being illuminated with the second flash includes the scene being illuminated by a second plurality of light sources of one or more of the plurality of colors, illumination provided by the second plurality of light sources having a different color than illumination provided by the first plurality of light sources.

Example 12 provides the camera device according to any one of the preceding examples, where the first color point is a color point of a cold white color and the second color point is a color point of a warm white color.

Example 13 provides the camera device according to any one of the preceding examples, where the camera device further includes one of more of the camera, the first flash, and the second flash.

Example 14 provides the camera device according to any one of the preceding examples, where the camera device further includes an output device, configured to display one or more of the first image, the second image, and the final image.

Example 15 provides the camera device according to any one of the preceding examples, where the camera device further includes an input device, configured to receive user input to be used by the camera device to perform one of more of cause the camera to acquire the first image, cause the camera to acquire the second image, and generate the final image.

Example 16 provides the camera device according to any one of the preceding examples, where the camera device further includes one or more communication chips and an antenna, configured to wirelessly transmit one or more of the first image, the second image, and the final image, or wirelessly receive input to be used by the camera device to perform one of more of cause the camera to acquire the first image, cause the camera to acquire the second image, and generate the final image.

Example 17 provides the camera device according to any one of the preceding examples, where the camera device is a wearable camera device (e.g., a smart watch), a hand-held camera device (e.g., a mobile phone), or a stationary camera (e.g., a security/surveillance camera).

Example 18 provides a non-transitory computer-readable storage medium, storing computer-readable instructions operable to, when the instructions are executed on a processor, to retrieve, or cause a camera to acquire, a first image of a scene taken by a camera while the scene is being illuminated with a first flash while not being illuminated with a second flash, the first flash causing the first image to be associated with a first color point; retrieve, or cause a camera to acquire, a second image of the scene taken by the camera while the scene is being illuminated with the second flash while not being illuminated with the first flash, the second flash causing the second image to be associated with a second color point, different from the first color point; and generate a final image of the scene based on a combination of the first image and the second image.

Example 19 provides a method for operating a camera device, the method including causing a camera to acquire a first image of a scene while the scene is being illuminated with a first flash while not being substantially illuminated with a second flash, the first flash causing the first image to be associated with a first color point; causing the camera to acquire a second image of the scene while the scene is being illuminated with the second flash while not being substantially illuminated with the first flash, the second flash causing the second image to be associated with a second color point, different from the first color point; and generating a final image of the scene based on a combination of the first image and the second image.

Example 20 provides the method according to example 19, where the final image is generated as a weighted combination of the first image and the second image.

Further examples provide a computer program product that includes instructions configured to operate the camera device according to any one of the preceding examples and/or to implement the method according to any one of the preceding examples.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

In some embodiments, any number of electrical circuits of the accompanying drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In some embodiments, the electrical circuits of, or associated with, the accompanying drawings may be implemented as stand-alone modules (e.g., a device with associated components and circuitry configured to perform a specific application or function) or implemented as plug-in modules into application specific hardware of electronic devices. Note that some embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multichip-module (MCM), with a plurality of separate ICs located within a single electronic package and configured to interact closely with each other through the electronic package. In various other embodiments, at least some aspects of the multi-flash with image post-processing may be implemented in one or more silicon cores in Application Specific Integrated Circuits (ASICs), Field Programmable Gate Arrays (FPGAs), and other semiconductor chips.

It is also important to note that the functions related to multi-flash with image post-processing, e.g., those summarized in the one or more processes shown in FIG. 2, illustrate only some of the possible functions that may be executed by, or within, the camera devices as described herein. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

The invention claimed is:
1. A camera device, comprising:
a controller, configured to
cause a camera to acquire a first image of a scene while the scene is being illuminated with a first set of light sources, the first set of light sources for causing the first image to be associated with a first color point;
cause the camera to acquire a second image of the scene while the scene is being illuminated with a second set of light sources, the second set of light sources for causing the second image to be associated with a second color point;
obtain a third color point, the third color point associated with the scene not being illuminated with the first set of light sources and not being illuminated with the second set of light sources, wherein each of the first color point, the second color point, and the third color point has a respective location in a plot having a first axis and a second axis, the first axis indicating values of a ratio of a sum of at least a sub-set of pixel values of a first primary color to a sum of at least a sub-set of pixel values of a third primary color, and the second axis indicating values of a ratio of a sum of at least a sub-set of pixel values of a second primary color to the sum of at least the sub-set of pixel values of the third primary color; and generate a final image of the scene based on a combination of the first image and the second image by
computing a correction factor based on at least a value indicative of the location of the first color point, a value indicative of the location of the second color point, and a value indicative of the location of the third color point,
generating a modified first image by modifying each of pixel values of the first image by a first value based on the correction factor,
generating a modified second image by modifying each of pixel values of the second image by a second value based on the correction factor, and
generating the final image based on pixel values of the modified first image and pixel values of the modified second image.

2. The camera device according to claim 1, wherein the controller is configured to generate the final image of the scene based on the combination of the first image and the second image by generating the final image by adding, on a pixel-by-pixel basis, a value computed based on a pixel value of the first image with a value computed based on a corresponding pixel value of the second image.

3. The camera device according to claim 1, wherein the controller is further configured to:
cause the camera to acquire a third image of the scene while the scene is not being illuminated with the first set of light sources and not being illuminated with the second set of light sources, and
generate the final image further based on a color point associated with the third image.

4. The camera device according to claim 1, wherein:
the controller is configured to compute the correction factor based on at least the location of the third color point with respect to the location of the first color point and the location of the second color point along the first axis of the plot.

5. The camera device according to claim 1, wherein:
the controller is configured to compute the correction factor based on at least the location of the third color point with respect to the location of the first color point and the location of the second color point along the second axis of the plot.

6. The camera device according to claim 1, wherein:
the controller is configured to compute the correction factor based on at least the location of the third color point with respect to a line in the plot connecting the location of the first color point and the location of the second color point.

7. The camera device according to claim 1, wherein the controller is configured to generate a second final image of the scene based on the combination of the first image and the second image by:
receiving a user input indicative of a factor representing a balance between the first image and the second image in the second final image,
generating a second modified first image by modifying each of pixel values of the first image by a first value based on the received factor,
generating a second modified second image by modifying each of pixel values of the second image by a second value based on the received factor, and
generating the second final image based on pixel values of the second modified first image and pixel values of the second modified second image.

8. The camera device according to claim 1, wherein:
the camera device is a video recording device configured to generate a video that includes a plurality of consecutive frames, and
the final image is one of the plurality of frames of the video.

9. The camera device according to claim 8, wherein each frame of the plurality of frames of the video is generated as a respective final image based on a combination of a respective first image and a respective second image acquired for the frame.

10. The camera device according to claim 1, wherein:
the scene being illuminated with the first set of light sources includes the scene being illuminated by a first plurality of light sources of one or more of a plurality of colors, and
the scene being illuminated with the second set of light sources includes the scene being illuminated by a second plurality of light sources of one or more of the plurality of colors, illumination provided by the second plurality of light sources having a different color than illumination provided by the first plurality of light sources.

11. The camera device according to claim 1, wherein the first color point is a color point of a cold white color and the second color point is a color point of a warm white color.

12. The camera device according to claim 1, wherein the camera device further includes one of more of the camera, the first set of light sources, and the second set of light sources.

13. The camera device according to claim 1, wherein the camera device further includes an output device, configured to display one or more of the first image, the second image, and the final image.

14. The camera device according to claim 1, wherein the camera device further includes an input device, configured to receive user input to be used by the camera device to perform one of more of:
causing the camera to acquire the first image,
causing the camera to acquire the second image, and
generating the final image.

15. The camera device according to claim 1, wherein the camera device further includes one or more communication chips and an antenna, configured to:
wirelessly transmit one or more of the first image, the second image, and the final image, or
wirelessly receive input to be used by the camera device to perform one of more of cause the camera to acquire the first image, cause the camera to acquire the second image, and generate the final image.

16. The camera device according to claim 1, wherein the camera device is a wearable camera device, a hand-held camera device, or a stationary camera.

17. A non-transitory, computer-readable storage medium storing computer-readable instructions operable, when the instructions are executed on a processor, to:
retrieve a first image of a scene taken by a camera while the scene is being illuminated with a first set of light sources, the first set of light sources for causing the first image to be associated with a first color point;
retrieve a second image of the scene taken by the camera while the scene is being illuminated with a second set of light sources, the second set of light sources for causing the second image to be associated with a second color point, different from the first color point;
obtain a third color point, the third color point associated with the scene not being illuminated with the first set of light sources and not being illuminated with the second set of light sources, each of the first color point, the second color point, and the third color point having a respective location in a plot having a first axis and a second axis, the first axis indicating values of a ratio of a sum of at least a sub-set of pixel values of a first primary color to a sum of at least a sub-set of pixel values of a third primary color, and the second axis indicating values of a ratio of a sum of at least a sub-set of pixel values of a second primary color to the sum of at least the sub-set of pixel values of the third primary color; and generate a final image of the scene based on a combination of the first image and the second image by
computing a correction factor based on at least a value indicative of the location of the first color point, a value indicative of the location of the second color point, and a value indicative of the location of the third color point,
generating a modified first image by modifying each of pixel values of the first image by a first value based on the correction factor,
generating a modified second image by modifying each of pixel values of the second image by a second value based on the correction factor, and
generating the final image based on pixel values of the modified first image and pixel values of the modified second image.

18. The medium according to claim 17, wherein the correction factor is computed based on at least one of the following equations:

$$\gamma = \frac{(R_a/G_a) - (R_2/G_2)}{(R_1/G_1) - (R_2/G_2)},$$

$$\gamma = \frac{(B_a/G_a) - (B_2/G_2)}{(B_1/G_1) - (B_2/G_2)},$$

$$\gamma = \frac{(B'_a/G'_a) - (B_2/G_2)}{(B_1/G_1) - (B_2/G_2)}, \text{ or}$$

$$\gamma = \frac{(R'_a/G'_a) - (R_2/G_2)}{(R_1/G_1) - (R_2/G_2)},$$

where $\gamma$ is the correction factor, R is the first primary color, B is the second primary color, G is the third primary color, 1 represents the location of the first color point, 2 represents the location of the second color point, a represents the location of the third color point, and ' represents a location of the third color point with respect to a line in the plot connecting the location of the first color point and the location of the second color point.

19. A method for operating a camera device, the method comprising:
causing a camera to acquire a first image of a scene while the scene is being illuminated with a first set of light sources, the first set of light sources for causing the first image to be associated with a first color point;
causing the camera to acquire a second image of the scene while the scene is being illuminated with a second set of light sources, the second set of light sources for causing the second image to be associated with a second color point, different from the first color point;
obtaining a third color point, the third color point associated with the scene not being illuminated with the first set of light sources and not being illuminated with the second set of light sources, each of the first color point, the second color point, and the third color point having a respective location in a plot having a first axis and a second axis, the first axis indicating values of a ratio of a sum of at least a sub-set of pixel values of a first primary color to a sum of at least a sub-set of pixel values of a third primary color, and the second axis indicating values of a ratio of a sum of at least a sub-set of pixel values of a second primary color to the sum of at least the sub-set of pixel values of the third primary color; and
generating a final image of the scene based on a combination of the first image and the second image by
computing a correction factor based on at least a value indicative of the location of the first color point, a value indicative of the location of the second color point, and a value indicative of the location of the third color point,
generating a modified first image by modifying each of pixel values of the first image by a first value based on the correction factor,
generating a modified second image by modifying each of pixel values of the second image by a second value based on the correction factor, and
generating the final image based on pixel values of the modified first image and pixel values of the modified second image.

20. The method according to claim 19, wherein the final image is generated as a weighted combination of the first image and the second image.

* * * * *